(12) United States Patent
Stattin et al.

(10) Patent No.: US 9,930,699 B2
(45) Date of Patent: Mar. 27, 2018

(54) PROVIDING ACCESS CONTROL PARAMETERS TO A USER EQUIPMENT

(71) Applicant: Telefonaktiebolaget LM Ericsson (publ), Stockholm (SE)

(72) Inventors: Magnus Stattin, Upplands Väsby (SE); Paul Schliwa-Bertling, Ljungsbro (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 19 days.

(21) Appl. No.: 15/028,079

(22) PCT Filed: Oct. 24, 2014

(86) PCT No.: PCT/SE2014/051259
§ 371 (c)(1),
(2) Date: Apr. 8, 2016

(87) PCT Pub. No.: WO2015/065271
PCT Pub. Date: May 7, 2015

(65) Prior Publication Data
US 2016/0255657 A1 Sep. 1, 2016

Related U.S. Application Data

(60) Provisional application No. 61/898,225, filed on Oct. 31, 2013.

(51) Int. Cl.
*H04W 4/00* (2009.01)
*H04W 74/08* (2009.01)
(Continued)

(52) U.S. Cl.
CPC ....... *H04W 74/0833* (2013.01); *H04W 28/24* (2013.01); *H04W 48/02* (2013.01); *H04W 48/12* (2013.01); *H04W 74/006* (2013.01)

(58) Field of Classification Search
CPC ........... H04W 74/0833; H04W 74/006; H04W 28/24; H04W 48/02; H04W 48/12
See application file for complete search history.

(56) References Cited

U.S. PATENT DOCUMENTS

| 2009/0016282 A1 | 1/2009 | Gasparroni et al. |
| 2010/0159990 A1 | 6/2010 | Johnstone |

(Continued)

FOREIGN PATENT DOCUMENTS

| CN | 103139868 A1 | 6/2013 |
| EP | 1097604 A1 | 5/2001 |

(Continued)

OTHER PUBLICATIONS

International Search Report and Written Opinion dated Jun. 26, 2014 (from related application) for International Application No. PCT/SE2014/050319, International Filing Date Mar. 17, 2014 consisting of 11 pages.

(Continued)

*Primary Examiner* — Kiet Tang
(74) *Attorney, Agent, or Firm* — Christopher & Weisberg, P.A.

(57) ABSTRACT

The present disclosure relates to a method performed in a base station in a radio communication system. The method comprises including an access control parameter in an access control message to be transmitted over a radio interface, the access control parameter being configured for allowing a radio device which receives it as part of an access procedure for accessing the radio communication system to determine whether access to said system is permitted. The method also comprises sending the access control message on a channel which a radio device that intends to connect to the base station has to receive as part of its access procedure. The access control message is sent or indicated on a Physical Downlink Control Channel (PDCCH). The disclosure also (Continued)

relates to a method performed in a radio device, as well as to a base station and a radio device.

17 Claims, 2 Drawing Sheets

(51) Int. Cl.
  *H04W 48/02* (2009.01)
  *H04W 48/12* (2009.01)
  *H04W 28/24* (2009.01)
  *H04W 74/00* (2009.01)

(56) References Cited

U.S. PATENT DOCUMENTS

| | | | |
|---|---|---|---|
| 2010/0265918 A1* | 10/2010 | Marinier | H04W 36/20 |
| | | | 370/332 |
| 2011/0032898 A1 | 2/2011 | Kazmi et al. | |
| 2012/0033613 A1 | 2/2012 | Lin et al. | |
| 2012/0040643 A1 | 2/2012 | Diachina et al. | |
| 2012/0082099 A1* | 4/2012 | Bienas | H04W 74/008 |
| | | | 370/329 |
| 2013/0035064 A1 | 2/2013 | Balachandran et al. | |
| 2013/0039309 A1 | 2/2013 | Chiu | |
| 2013/0051325 A1 | 2/2013 | Ryu et al. | |
| 2013/0122906 A1 | 5/2013 | Klatt | |

FOREIGN PATENT DOCUMENTS

| | | |
|---|---|---|
| EP | 2445266 A1 | 10/2010 |
| WO | 0005913 A1 | 2/2000 |
| WO | 2012013355 A1 | 2/2012 |
| WO | 2014148990 A1 | 9/2014 |

OTHER PUBLICATIONS

3GPP TSG-RAN WG1 Meeting #71, R2-104501, Agenda item: 4.3.2.2, (UMTS/LTE Joint REL10: SI MTC (RP-100330): RAN Overload), Source: Deutsche Telekom, Title: "Overload Control for Machine Type Communication", Document for Discussion and Decision, Conference Location and Date: Madrid, Spain, Aug. 23-27, 2010 consisting of 2-pages.
International Search Report and Written Opinion dated Feb. 13, 2015 for International Application No. PCT/SE2014/051259, International Filing Date Oct. 24, 2014 consisting of 10 pages.
Corrected Written Opinion of the International Preliminary Examining Authority dated Jan. 12, 2016 for International Application No. PCT/SE2014/051259, International Filing Date Oct. 24, 2014 consisting of 10 pages.
International Preliminary Report on Patentability dated Jan. 26, 2016 for International Application No. PCT/SE2014/051259, International Filing Date Oct. 24, 2014 consisting of 18 pages.
3GPP TSG RAN WG2 #74, R2-112865, Agenda item: 4.11, Source: ZTE, Title: "Discussion on Fast Method for Dynamic Access Control", Document for Discussion, Conference Location and Date: Barcelona, Spain, May 9-13, 2011 consisting of 4 pages.
Office Action dated May 8, 2017 in U.S. Appl. No. 14/778,024, filed Sep. 17, 2015 consisting of 11-pages.

* cited by examiner

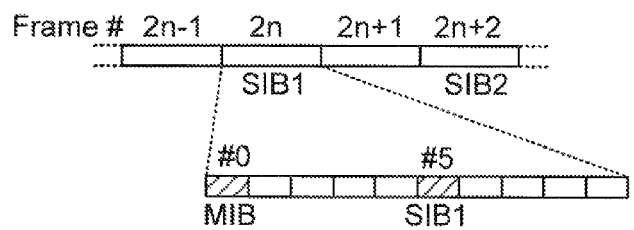
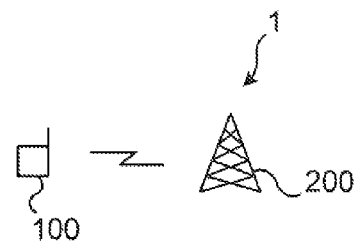
Fig. 1
Fig. 2
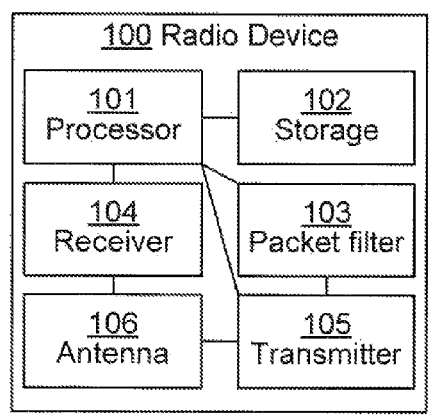
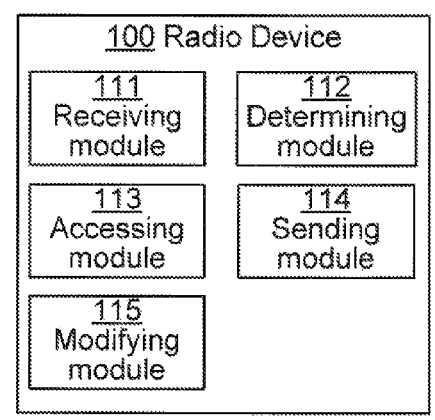
Fig. 3a
Fig. 3b
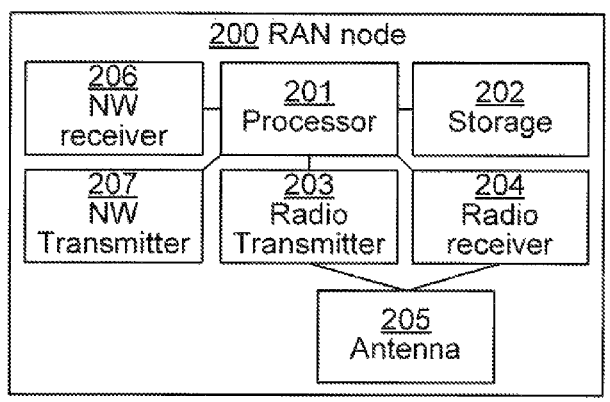
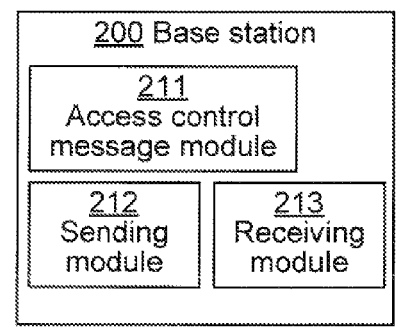
Fig. 4a
Fig. 4b

PROVIDING ACCESS CONTROL PARAMETERS TO A USER EQUIPMENT

TECHNICAL FIELD

The present disclosure relates to methods and devices for providing access control parameters to a user equipment (UE) in a radio communication system.

BACKGROUND

In a typical cellular radio system, wireless terminals (also known as radio devices, mobile stations and/or user equipments (UEs)) communicate via a radio access network (RAN) to one or more core networks (CN). The wireless terminals can be mobile stations or user equipments (UE) such as mobile telephones (cellular telephones) and laptops with wireless capability (e.g., mobile termination), and thus can be, for example, portable, pocket, hand-held, computer-included, or car-mounted mobile devices which communicate voice and/or data via radio access network.

The radio access network (RAN) covers a geographical area which is divided into cell areas, with each cell area being served by a base station, e.g., a radio base station (RBS), which in some networks is also called Node B (NB) or evolved Node B (eNode B or eNB). A cell is a geographical area where radio coverage is provided by the radio base station equipment at a base station site. Each cell is identified by an identity within the local radio area, which is broadcast in the cell. The base stations communicate over the air interface operating on radio frequencies with the user equipments (UE) within range of the base stations.

In some versions (particularly earlier versions) of the radio access network, several base stations are typically connected (e.g., by landlines or microwave) to a radio network controller (RNC). The radio network controller, also sometimes termed a base station controller (BSC), supervises and coordinates various activities of the plural base stations connected thereto.

The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. Universal Terrestrial Radio Access Network (UTRAN) is essentially a radio access network using wideband code division multiple access for user equipments (UEs). The Third Generation Partnership Project (3GPP) has undertaken to evolve further the UTRAN and GSM based radio access network technologies.

Long Term Evolution (LTE) is a variant of a 3GPP radio access technology wherein the radio base station nodes are connected directly to a core network rather than to radio network controller (RNC) nodes. In general, in LTE the functions of a radio network controller (RNC) node are performed by the radio base station nodes. As such, the radio access network (RAN) of an LTE system has an essentially flat architecture comprising radio base station nodes without reporting to radio network controller (RNC) nodes.

The following description, for purposes of explanation, refers to LTE, WCDMA, UTRAN or evolved UTRAN (E-UTRAN or eUTRAN). This does however not limit the applicability to other technologies.

Access Control

UTRAN and LTE offer so called access control mechanisms by which the network can prevent UEs from accessing the network. Obviously, this is desirable when the network experiences an unsustainable high load. This may be the case if, due to access burst, there are no further radio or processing resources in the eNB/NB available to fulfill the service requirements of all UEs that desire to transmit data. In such situations it is preferable to prevent additional (IDLE) UEs from accessing the network and thereby to offer sufficient quality of experience to already connected UEs.

This is known as access barring. Similarly, the NW may decide to reject or release already connected (RRC CONNECTED) UEs from the NW. This is known as RRC CONNECTION REJECT or RRC CONNECTION RELEASE.

Standardized access barring schemes allow to block certain UEs while still permitting others to access the network. In particular the specifications allow distinguishing mobile terminating calls, mobile originating calls, emergency calls, mobile originating signaling, mobile originating CS fallback, special access classes (Access Classes 11-15), and extended access barring (for lower priority traffic). Furthermore, there exist means to prevent UEs from performing access for multimedia telephony (MMTEL) MMTEL-Voice or MMTEL-Video. In LTE and UMTS the access barring schemes are currently only applicable for UEs in IDLE mode. That means, a UE that is already in RRC CONNECTED may access the network even if the current cell indicates that access is barred. It has recently been proposed in 3GPP to extend access barring so that it is also applicable to UEs in RRC CONNECTED. Such investigations are on-going.

QoS in LTE and UMTS

LTE and UMTS make use of so called quality of service (QoS) Classes (QCI) that were introduced to achieve an abstraction between services and their quality of service requirements on one side and the RAN and its scheduling QoS logic on other side.

The core network (CN) decides how many different levels of quality of service need to be distinguished in the RAN (and potentially in the transport and core network) and sets up a corresponding number of radio bearers for each UE. The core network also defines so-called packet filters which allow the non-access-stratum (NAS) layer in the UE and the core network (in a gateway of the CN) to decide which packet to map onto which bearer. This filtering is primarily done based on source and destination IP address and port number. It is therefore flexible so that the network can easily map different kinds of applications to different bearers.

With this approach, the access stratum (in the RAN) only distinguishes bearers while it does not need to be service aware. All data mapped (by packet filters in the UE) onto one bearer is expected to get the same QoS treatment by the RAN and the UE. The packet treatment is determined by the core network which sets the QoS class indicator (QCI) for each established bearer.

In the RAN, evolved packet system (EPS) bearers are mapped to data radio bearers (DRBs) having logical channel identity (LCI). Scheduling and prioritization of data packets in the RAN is done based on logical channels in radio resource control (RRC) Connected mode.

Random Access

In modern cellular radio systems, the radio network has a strict control on the behavior of the UE. Uplink (UL) transmission parameters like frequency, timing, and power are regulated via downlink (DL) control signaling from the base station to the UE.

At power-on or after a long standby time, the UE is not synchronized in the uplink. The UE can derive an uplink frequency and power estimate from the downlink control signals. However, a timing estimate is difficult to make since the round-trip propagation delay between the base station, e.g. eNodeB radio base station in LTE, and the UE is unknown. So even if UE uplink timing is synchronized to the downlink, it may arrive too late at the eNodeB receiver because of the propagation delays. Therefore, before commencing traffic, the UE has to carry out a Random Access (RA) procedure to the network. After the RA, the eNodeB can estimate the timing misalignment of the UE uplink and send a correction message. During the RA, uplink parameters like timing and power are not very accurate. This poses extra challenges to the dimensioning of a RA procedure.

Usually, a Physical Random Access Channel (PRACH) is provided for the UE to request access to the network. An RA preamble is used which is based on a specific sequence with good auto-correlation. Because multiple UEs can request access at the same time, collisions may occur between requesting UEs. A contention resolution scheme then has to be implemented to separate the UE transmissions. To distinguish between different UEs performing RA, typically many different preambles exist. A UE performing RA randomly picks a preamble out of a pool of preambles and transmits it. The preamble represents a random UE identity (ID) which can be used by the eNodeB when granting the UE access to the network. The eNodeB receiver can resolve RA attempts performed with different preambles and send a response message to each UE using the corresponding random UE IDs. In case that multiple UEs simultaneously use the same preamble, a collision occurs and most likely the RA attempts are not successful since the eNodeB cannot distinguish between the two UEs with the same random UE ID.

To minimize the probability of collision, the set of available sequences, i.e. preambles, should be large. In LTE, the number of provided sequences per cell and RA opportunity is 64. Preambles assigned to adjacent cells are typically different to insure that a RA in one cell does not trigger any RA events in a neighboring cell.

LTE defines different RA configurations that differ in the amount of offered RA opportunities. A RA opportunity is approximately 1 MHz wide and either 1, 2, or 3 milliseconds (ms) long within which the UE can transmit the RA preamble. In the configuration with the lowest number of opportunities, one opportunity is offered every second radio frame, i.e. every 20 ms. On the other extreme the configuration with the highest density of RA opportunities offers one RA opportunity every subframe, i.e. every ms.

The eNodeB receiver listens at all RA opportunities to detect preambles. In case a preamble is successfully detected, a RA response that includes the number of the detected preamble is sent in a special message on the DL. A UE that has recently performed a RA attempt is listening on the DL within a certain time window after the preamble has been sent, to receive a RA response. In case of a successful reception of the RA response, the UE continues with the RA procedure steps for contention resolution. In case no RA response is received within the specified window, a new attempt is made. Also, if the contention resolution does not indicate that the UE won the contention, a new attempt is made. The power of this new attempt preamble transmission is increased by a configured step size relative to the previous attempt. Depending on the back-off parameter in the UE, the UE may immediately re-try or wait for a random time depending on the configured back-off time prior a new attempt.

In addition to a contention-based RA procedure, LTE supports a contention-free variety of the RA procedure in which the eNodeB directs the UE to use a specific preamble not simultaneously used by any other UE in the same cell and the steps of contention resolution are not needed.

If the number of unsuccessful RA attempts exceeds a configured threshold, lower layers in the UE terminal indicate to higher layers that there is a random access problem. In LTE, the Medium Access Control (MAC) layer indicates a random access problem to a Radio Resource Control (RRC) and continue random access attempts, i.e. the random access procedure is not stopped. Depending on higher layer state and conditions, higher layers declare a radio link failure or let the random access procedure continue until one or more higher layer procedure timers expire/time-out or a stopping condition is met.

System Information

In mobile cellular networks, system information is broadcasted in each cell and contains various information needed for the user equipment to both access the cell and properly operate within the cell. In LTE, system information is structured into one Master Information Block (MIB) and a number of (currently 16) System Information Blocks (SIBs), referred to as SIB1 through SIB16. The MIB is transmitted in subframe #0 of the LTE radio frame. In contrast to the MIB, SIBs are schedulable in both time and frequency (SIB2 through SIB16), or in frequency only (SIB1). FIG. 1 illustrates the timing of transmissions of MIB and SIB1. In LTE, SIB1 is transmitted in subframe #5 of even radio frames.

The timing of other SIBs (SIB2 through SIB16) is provided with the scheduling list field provided in SIB1. Hence, to acquire SIBs other than SIB1, the UE needs to first acquire SIB1.

System Information comprise access control information, e.g., cell barring parameters in SIB1, access class barring parameters in SIB2 and extended access barring parameters in SIB14.

System information (SI) can be updated at regular points in time by the network, wherein a concept of a modification period is used. The network may only update SI at modification period boundaries. The length of the modification period is communicated to the UE, so it knows when the boundaries occur. When the network decides to update SI, it sends a paging message containing the systemInfoModification field. At the next modification period boundary, the updated SI is broadcasted, and the UEs may acquire the updated SI. There is also a field in SIB1 called systemInfoValueTag which is incremented each time the SI is updated, with some exceptions. This means that a UE can compare its previously acquired systemInfoValueTag with the one currently broadcasted to establish whether its SI is valid or not. In order for a UE to know whether its SI is valid or not, there are two legacy methods: the UE reads the paging messages, or the UE checks the systemInfoValueTag.

One exception to the system information update procedure is update of extended access barring parameters. Extended access barring parameters in SIB14 can be changed at any time and UEs can be informed about a change by means of a paging message including eabParamModification. An extended access barring capable UE is not expected to periodically check schedulingInfoList contained in SIB1.

SUMMARY

While the existing cell and access barring mechanisms seems to already offer a great level of flexibility, the provisioning of the parameters in System Information is problematic. In particular for high priority services and services requiring low latency, the need to acquire SIBs prior to accessing the system may introduce an unacceptable delay.

There is a limited possibility to control the delay by scheduling relevant SIBs more frequently. Broadcast of system information is however in general very expensive in terms of radio resources and system capacity and performance. The more often system information is repeated, the less capacity is available for user data.

The LTE paging mechanism for notifying UEs of a change of extended access barring parameters can reduce the need to check extended access barring status for UEs in IDLE mode. However, UEs in RRC CONNECTED mode are not required to monitor paging and therefore this solution does not work for UEs in RRC CONNECTED mode. Requiring UEs in RRC CONNECTED mode to monitor and receive paging would increase UE complexity and is therefore undesirable. To maximize resource utilization, it is beneficial to be able to change access control parameters quickly and frequently. Frequent paging as a means to ensure that UEs have valid access control parameters is inefficient as it requires UEs to frequently leave a more power efficient state to check the content of the paging message.

These problems with the prior art are in accordance with the present disclosure avoided by encoding/providing access control parameters on a (control) channel which the UE needs to receive (regardless of whether in connected or idle mode) as an integrated part of the access procedure (access attempt); e.g., in the Random Access Response of a downlink shared channel (DSCH) indicated in the Physical Downlink Control Channel (PDCCH), or on the PDCCH itself.

According to an aspect of the present disclosure, there is provided a method performed in a base station in a radio communication system. The method comprises including an access control parameter in an access control message to be transmitted over a radio interface, the access control parameter being configured for allowing a radio device which receives it as part of an access procedure for accessing the radio communication system to determine whether access to said system is permitted. The method also comprises sending the access control message on a channel which the radio device that intends to connect to the base station has to receive as part of its access procedure. The access control message is sent on a Physical Downlink Control Channel (PDCCH) or the access control message is indicated on the PDCCH.

According to another aspect of the present disclosure, there is provided a computer program product comprising computer-executable components for causing a base station to perform an embodiment of a method of the present disclosure when the computer-executable components are run on processor circuitry comprised in the base station.

According to another aspect of the present disclosure, there is provided a base station for a radio communication system. The base station comprises processor circuitry, and a storage unit storing instructions that, when executed by the processor circuitry, cause the base station to include an access control parameter in an access control message to be transmitted over a radio interface, the access control parameter being configured for allowing a radio device which receives it as part of an access procedure for accessing the radio communication system to determine whether access to said system is permitted. The instructions also cause the base station to send the access control message on a channel which the radio device that intends to connect to the base station has to receive as part of its access procedure. The access control message is sent or indicated on a PDCCH.

According to another aspect of the present disclosure, there is provided a method performed in a radio device associated with a radio communication system. The method comprises receiving an access control message comprising an access control parameter from a base station in the radio communication system, wherein the access control message is received on a PDCCH, or as indicated on the PDCCH, as part of an access procedure for accessing said system. The method also comprises determining, based on the received access control parameter, whether access to the system is permitted.

According to another aspect of the present disclosure, there is provided a computer program product comprising computer-executable components for causing a radio device to perform an embodiment of a method of the present disclosure when the computer-executable components are run on processor circuitry comprised in the radio device.

According to another aspect of the present disclosure, there is provided a radio device for a radio communication system. The radio device comprises processor circuitry, and a storage unit storing instructions that, when executed by the processor circuitry, cause the radio device to receive an access control message comprising an access control parameter from a base station in the radio communication system, wherein the access control message is received on a PDCCH, or as indicated on the PDCCH, as part of an access procedure for accessing said system. The instructions also cause the radio device to determine, based on the received access control parameter, whether access to the system is permitted.

According to another aspect of the present disclosure, there is provided a computer program comprising computer program code which is able to, when run on processor circuitry of a base station, cause the base station to include an access control parameter in an access control message to be transmitted over a radio interface, the access control parameter being configured for allowing a radio device which receives it as part of an access procedure for accessing the radio communication system to determine whether access to said system is permitted. The code is also able to cause the base station to send the access control message on a channel which the radio device that intends to connect to the base station has to receive as part of its access procedure. The access control message is sent or indicated on a PDCCH.

According to another aspect of the present disclosure, there is provided a computer program comprising computer program code which is able to, when run on processor circuitry of a radio device, cause the radio device to receive an access control message comprising an access control parameter from a base station in the radio communication system, wherein the access control message is received on a PDCCH, or as indicated on the PDCCH, as part of an access procedure for accessing said system. The code is also able to cause the radio device to determine, based on the received access control parameter, whether access to the system is permitted.

According to another aspect of the present disclosure, there is provided a computer program product comprising an embodiment of a computer program of the present disclosure and a computer readable means on which the computer program is stored.

Today, many mobile broadband networks are highly loaded in particular during peak hours. In such situations it is often not possible to admit all radio devices to the network while still maintaining the expected level of QoS to all of them. It is then desirable to block certain traffic in order to maintain at least the important traffic (e.g. VoIP or higher priority data or traffic from premium subscribers). Existing solutions for provisioning of the parameters in System Information are problematic. In particular for high priority services and services requiring low latency, the need to acquire SIBs prior to accessing the system may introduce unacceptable delay. Paging as a means to ensure radio devices have valid access control parameters is inefficient as it requires radio devices to frequently leave a more power efficient state to check content of the paging message.

In accordance with the aspects of the present disclosure, delays for checking validity of and acquiring access control parameters from broadcasted System Information can be avoided. Overhead from paging transmission and reception can also be avoided. The radio device/UE only needs to receive and decode channels and messages which are integral parts of its access procedure to find the access control parameter(s) or an indication thereof. The actual access control message may e.g. be either on the PDCCH or on another channel as indicated on the PDCCH.

The access control parameter may be any parameter which can be used by a radio device for determining whether the radio device is allowed to access the communication system, typically by connecting to the base station sending the parameter. The parameter may e.g. indicate whether access is allowed to a certain cell or base station of the radio access network (RAN) of the system, or to a certain radio access technology (RAT) or network operator comprised in the system, or to a certain service provided via the system, or for certain types of traffic. The access control message is herein defined as any signaling comprising the access control parameter. The access procedure of a radio device is the procedure for accessing the radio communication system which is initiated by a random access (RA) preamble being sent by the radio device, or by another radio device allowing the radio device to listen to the response sent to said other radio device to obtain the access control parameter.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 1 is a schematic diagram illustrating the timing of transmissions of MIB and SIB1 in a frame, in accordance with prior art.

FIG. 2 is a schematic overview of an embodiment of a communication system in accordance with the present disclosure.

FIG. 3a is a schematic block diagram of an embodiment of a radio device in accordance with the present disclosure.

FIG. 3b is a schematic functional block diagram of an embodiment of a radio device in accordance with the present disclosure.

FIG. 4a is a schematic block diagram of an embodiment of a RAN node in accordance with the present disclosure.

FIG. 4b is a schematic functional block diagram of an embodiment of a RAN node in accordance with the present disclosure.

DETAILED DESCRIPTION

Figure 5:
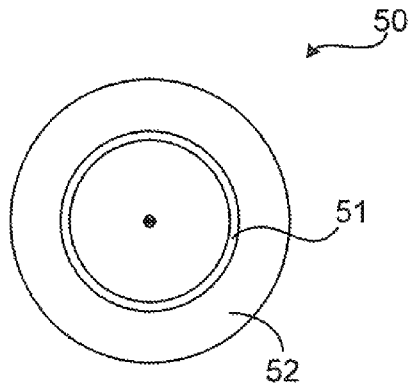
FIG. 5 is a schematic illustration of an embodiment of a computer program product in accordance with the present disclosure.

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

The radio device may be any device, mobile or stationary, enabled to communicate over a radio cannel in a communications network in accordance with any radio communication standard (e.g. LTE), for instance but not limited to e.g. mobile phone, smart phone, modem, sensors, meters, vehicles, household appliances, medical appliances, media players, cameras, or any type of consumer electronic, for instance but not limited to television, radio, lighting arrangements, tablet computer, laptop, or personal computer (PC). Herein the radio device is also referred to as e.g. a user equipment (UE) or a mobile terminal. Similarly, the RAN node base station may be any base station enabled to communicate over a radio cannel in a communications network in accordance with any radio communication standard, e.g. a Node B, or an eNodeB in LTE.

Below follows a presentation of some more specific embodiments of the aspects of the present disclosure discussed above. The embodiments are combinable with each other unless otherwise apparent or stated.

In some embodiments of the aspects of the present disclosure, the access control message is transmitted by the base station and/or received by the radio device as part of the RA Response. By providing access control parameters in the Random Access Response, delays for checking validity of and acquiring access control parameters from broadcasted System Information is avoided. Overhead from paging transmission and reception is also avoided. When receiving access control parameters in the random access response, the radio device determines based on, e.g., the access control parameters provided in the random access response, whether access is permitted. If access is permitted, the radio device proceeds with its access attempt. If access is not permitted, the radio device aborts the access attempt. Random Access Responses are expected to be transmitted rather frequently and hence can be expected to be available shortly prior to an access attempt. Since the effort to check for an alternative Radio Network Temporary Identity (RNTI) is essentially limited to computing a PDCCH cyclic redundancy check (CRC), this method enables access control with very low latency and effort.

Additionally or alternatively, in some embodiments of the aspects of the present disclosure, the access control message is transmitted by the base station and/or received by the radio device on the PDCCH, e.g., as part of a Downlink Control Information (DCI) format or associated with a particular Radio Network Temporary Identity (RNTI). The Random Access Response solution can be combined with a PDCCH solution, e.g., by associating one or more additional sets of RA-RNTIs (used for identifying DL assignments on PDCCH pertaining to Random Access Response transmissions on PDSCH) with access control parameters or behaviors. E.g., one set of RA-RNTIs may be associated with an access control parameter indicative of access allowed only for the purpose of voice services. An (RA-)RNTI can also be associated with a special behavior with regard to e.g. back-off. For example, a certain (set of) (RA-)RNTIs could be indicative of that the legacy back-off mechanism should be ignored. Thus, there may be a special (set of) RNTI(s) indicating the access control message. The special RNTI(s) may be used for the access control message, e.g. an RNTI indicating to the radio device that there is an access control message and the DCI on the PDCCH indicating to the radio device where to find said message.

In some embodiments of the aspects of the present disclosure, additional parameter(s) is/are also included in the access control message, such as additional access control parameter(s), and/or parameters controlling or modifying the radio device behaviour after determining that access to the base station is not permitted. Such parameters could instruct the radio device/UE to, e.g., apply a wait time or delay before making another access attempt change the priority of the current cell or radio carrier select a different cell or radio carrier perform next access attempt on a different set of time/frequency resources.

In some embodiments of the aspects of the present disclosure, the radio device tries to receive access control messages (e.g. included in random access responses) addressed to any other radio device prior to performing its access attempt. For example, if a random access response containing the relevant access control information is successfully received, the radio device can determine whether access is permitted and/or whether other behavior and/or action is required, before transmitting the random access preamble sequence. Thereby enabling a further reduction of access attempts, e.g. not even performing RA.

FIG. 2 schematically illustrates an embodiment of a communication system 1 in accordance with the present disclosure. A radio device 100 communicates with a base station 200 of the system 1 over a radio interface. The base station 200 may e.g. be a node in a radio access network (RAN) of a Long Term Evolution (LTE) radio communication network.

FIG. 3a schematically illustrates an embodiment of a radio device/UE 100 of the present disclosure. The radio device 100 comprises a processor or central processing unit (CPU) 101. The processor 101 may comprise one or a plurality of processing units in the form of microprocessor(s). However, other suitable devices with computing capabilities could be used, e.g. an application specific integrated circuit (ASIC), a field programmable gate array (FPGA) or a complex programmable logic device (CPLD). The processor 101 is configured to run one or several computer program(s) or software 51 (see FIG. 5) stored in a storage unit or memory 102. The storage unit is regarded as a computer readable means 52 (see FIG. 5) and may e.g. be in the form of a Random Access Memory (RAM), a Flash memory or other solid state memory, or a hard disk. The processor 101 is also configured to store data in the storage unit 102, as needed. The radio device 100 also comprises a transmitter 105 with transmitter circuitry, a receiver 104 with receiver circuitry and an antenna 106, which may be combined to form a transceiver or be present as distinct units within the radio device 100. The transmitter 105 is configured to cooperate with the processor to transform data bits to be transmitted over a radio interface 110 to a suitable radio signal in accordance with the radio access technology (RAT) used by the RAN via which the data bits are to be transmitted. The receiver 104 is configured to cooperate with the processor 101 to transform a received radio signal to data bits. The antenna 106 may comprise a single antenna or a plurality of antennas, e.g. for different frequencies and/or for MIMO (Multiple Input Multiple Output) communication. The antenna 106 is used by the transmitter 105 and the receiver 104 for transmitting and receiving, respectively, radio signals. The radio device 100 additionally comprises one or several packet filters 103 which are responsible for mapping UL data packets to the appropriate radio bearer, before the packets are transferred to the transmitter 105. The packet filters 103 may in some embodiments also be employed to apply the access control parameter(s) received by the radio device 100 in accordance with the present disclosure.

Thus, according to an aspect of the present disclosure, there is provided a radio device 100 for a radio communication system 1. The radio device comprises processor circuitry 101, and a storage unit 102 storing instructions 51 that, when executed by the processor circuitry, cause the radio device to receive an access control message comprising an access control parameter from a base station in the radio communication system, wherein the access control message is received on a PDCCH, or as indicated on the PDCCH, as part of an access procedure for accessing said system. The instructions also cause the radio device to determine, based on the received access control parameter, whether access to the system is permitted.

FIG. 3b is a schematic block diagram functionally illustrating an embodiment of the radio device 100 in FIG. 3a. As previously mentioned, the processor circuitry 101 may run software 51 for enabling the radio device 100 to perform an embodiment of a method of the present disclosure, whereby functional modules may be formed in radio device 100 e.g. in the processor circuitry 101 for performing the different steps of the method. These modules are schematically illustrated as blocks within the radio device 100. Thus, the radio device 100 comprises a receiving module 111 for receiving the access control message comprising an access control parameter from the base station 200 in the radio communication system 1. The radio device also comprises a determining module 112 for determining, based on the received access control parameter, whether access to the system 1 is permitted. In some embodiments, additionally or alternatively, the radio device also comprises an accessing module 113 for accessing the base station 200 in accordance with the received access control parameter. In some embodiments, the radio device comprises a sending module 114 for sending an access initiating signalling, e.g. a Random Access Preamble, to the base station 200. In some embodiments, additionally or alternatively, the radio device also comprises a modifying module 115 for modifying the behaviour of the radio device 100, if access to the system 1 is determined not to be permitted.

FIG. 4a is a schematic block diagram of an embodiment of a radio RAN node or base station 200 of the present disclosure. The base station 200 comprises a processor 201 e.g. a central processing unit (CPU). The processor 201 may comprise one or a plurality of processing units in the form of microprocessor(s). However, other suitable devices with computing capabilities could be comprised in the processor 201, e.g. an application specific integrated circuit (ASIC), a field programmable gate array (FPGA) or a complex programmable logic device (CPLD). The processor 201 is configured to run one or several computer program(s) or software 51 (see FIG. 5) stored in a storage unit 202 e.g. a memory. The storage unit is regarded as a computer readable means 52 (see FIG. 5) and may e.g. be in the form of a Random Access Memory (RAM), a Flash memory or other solid state memory, or a hard disk. The processor 201 is also configured to store data in the storage unit 202, as needed. The base station 200 also comprises a radio transmitter 203, a radio receiver 204 and an antenna 205, which may be combined to form a transceiver or be present as distinct units within the base station 200. The radio transmitter 203 is configured to cooperate with the processor to transform data bits to be transmitted over a radio interface to a suitable radio signal in accordance with the radio access technology (RAT) used by the Radio Access Network (RAN) via which the data bits are to be transmitted. The radio receiver 204 is configured to cooperate with the processor 201 to transform a received radio signal to data bits. The antenna 205 may comprise a single antenna or a plurality of antennas, e.g. for different frequencies and/or for MIMO (Multiple Input Multiple Output) communication. The antenna 205 is used by the radio transmitter 203 and the radio receiver 204 for transmitting and receiving, respectively, radio signals. The radio transmitter and the radio receiver can be viewed as part of a radio interface of the base station 200. Similarly, the base station 200 comprises a network (NW) interface comprising an NW receiver 206 and an NW transmitter 207 for communication with e.g. a core network (CN).

Thus, according to an aspect of the present disclosure, there is provided a base station 200 for a radio communication system 1. The base station comprises processor circuitry 201, and a storage unit 202 storing instructions 51 that, when executed by the processor circuitry, cause the base station to include an access control parameter in an access control message to be transmitted over a radio interface, the access control parameter being configured for allowing a radio device 100 which receives it as part of an access procedure for accessing the radio communication system to determine whether access to said system is permitted. The instructions also cause the base station to send the access control message on a channel which the radio device that intends to connect to the base station has to receive as part of its access procedure. The access control message is sent or indicated on a PDCCH.

FIG. 4b is a schematic block diagram functionally illustrating an embodiment of the base station 200 in FIG. 4a. As previously mentioned, the processor circuitry 201 may run software 51 for enabling the base station 200 to perform an embodiment of a method of the present disclosure, whereby functional modules may be formed in base station 200 e.g. in the processor circuitry 201 for performing the different steps of the method. These modules are schematically illustrated as blocks within the base station 200. Thus, the base station 200 comprises an access control message module 211 for including an access control parameter in the access control message to be transmitted over a radio interface. The base station 200 also comprises a sending module 212 for sending the access control message on a channel which the radio device 100 that intends to connect to the base station 200 has to receive as part of its access procedure. In some embodiments, the base station may also comprise a receiving module 213 for receiving access initiating signalling, e.g. a Random Access Preamble, from the radio device 100.

FIG. 5 illustrates a computer program product 50. The computer program product 50 comprises a computer readable medium 52 comprising a computer program 51 in the form of computer-executable components 51. The computer program/computer-executable components 51 may be configured to cause a radio device 100 or a base station 200, e.g. as discussed herein, to perform an embodiment of a method of the present disclosure. The computer program/computer-executable components may be run on the processor circuitry 101/201 of the radio device 100 or a base station 200 for causing it to perform the method. The computer program product 50 may e.g. be comprised in a storage unit or memory 102/202 comprised in the radio device 100 or a base station 200 and associated with the processor circuitry 101/201. Alternatively, the computer program product 50 may be, or be part of, a separate, e.g. mobile, storage means, such as a computer readable disc, e.g. CD or DVD or hard disc/drive, or a solid state storage medium, e.g. a RAM or Flash memory.

Figure 6A:
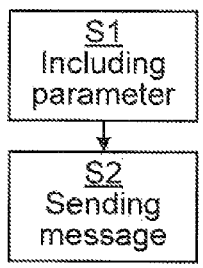
FIG. 6a is a schematic flow chart of an embodiment of a method performed in a RAN node, in accordance with the present disclosure.

FIG. 6a is a schematic flow chart of an embodiment of a method performed in a base station 200 in a radio communication system 1. The base station 200 includes S1 an access control parameter in an access control message to be transmitted over a radio interface, the access control parameter being configured for allowing a radio device 100 which receives it as part of an access procedure for accessing the radio communication system 1 to determine whether access to said system is permitted. Then, the base station 200 sends S2 the access control message on a channel which the radio device 100 that intends to connect to the base station 200 has to receive as part of its access procedure. The access control message is sent or indicated on a PDCCH.

Figure 6B:
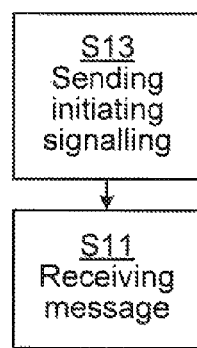
FIG. 6b is a schematic flow chart of another embodiment of a method performed in a RAN node, in accordance with the present disclosure.
Figure 6B:
Figure 6B:
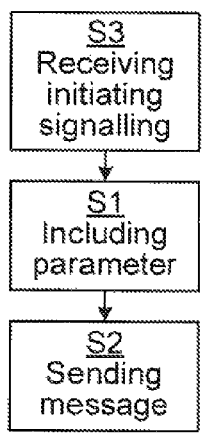

FIG. 6b is a schematic flow chart of another embodiment of the method performed in a base station 200 in a radio communication system 1. The steps of including S1 an access control parameter in an access control message and of sending S2 the access control message are as discussed in respect of FIG. 6a. In some embodiments, the base station 200 may, before the sending S2 of the access control message, receive S3 access initiating signalling, e.g. a Random Access Preamble, from the radio device 100, wherein the access control message is then sent S2 in response to said received S3 signalling.

Figure 7A:
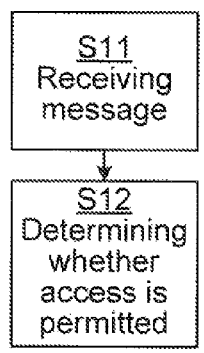
FIG. 7a is a schematic flow chart of an embodiment of a method performed in a radio device, in accordance with the present disclosure.

FIG. 7a is a schematic flow chart of an embodiment of a method performed in a radio device 100 associated with a radio communication system 1. The radio device 100 receives S11 an access control message comprising an access control parameter from a base station 200 in the radio communication system, wherein the access control message is received on a PDCCH, or as indicated on the PDCCH, as part of an access procedure for accessing said system. Then, the radio device 100, based on the received S11 access control parameter, determines S12 whether to access the system 1 is permitted.

Figure 7B:
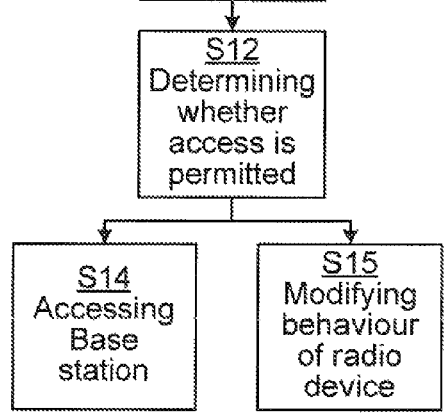
FIG. 7b is a schematic flow chart of another embodiment of a method performed in a radio device, in accordance with the present disclosure.

FIG. 7b is a schematic flow chart of another embodiment of the method performed in a radio device 100 associated with a radio communication system 1. The steps of receiving S11 an access control message and of determining S12 whether access is permitted are as discussed in respect of FIG. 7a. In some embodiments, the radio device 100 may, prior to receiving S11 the access control message, send S13 an access initiating signalling, e.g. a Random Access Preamble, to the base station 200. Additionally or alternatively, the radio device 100 may, if access has been determined S12 to be permitted, access S14 the base station 200 in accordance with the received S11 access control parameter. Alternatively, the radio device may, if access has been determined S12 not to be permitted, modify S15 the behaviour of the radio device 100 based on a parameter for controlling or modifying the behaviour of the radio device comprised in the received S11 access control message. It is noted that, that access is determined not to be permitted may imply that access to a certain service or that access for a certain type of traffic is not permitted, not necessarily that no access at all is permitted for the radio device. For instance, access for some type of traffic e.g. data traffic may not be permitted while access for some other type of traffic e.g. voice is permitted.

In the present disclosure, for purposes of explanation and not limitation, specific details are set forth such as particular architectures, interfaces, techniques, etc. in order to provide a thorough understanding of the aspects of the present disclosure. However, it will be apparent to those skilled in the art that embodiments of the present disclosure may be embodiments that depart from these specific details. That is, those skilled in the art will be able to devise various arrangements which, although not explicitly described or shown herein, embody the principles of the disclosure and are included within its spirit and scope. In some instances, detailed descriptions of well-known devices, circuits, and methods are omitted so as not to obscure the description of the present disclosure with unnecessary detail. All statements herein reciting principles, aspects, and embodiments of the present disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any methods of the present disclosure, and the like, represent various processes which may be substantially represented in computer readable medium and so executed by a computer or processor, whether or not such computer or processor is explicitly shown.

The functions of the various elements including functional blocks may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "processor circuitry" shall also be construed to refer to other hardware capable of performing such functions and/or executing software, such as the example hardware recited above.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

Below follow some other aspects of the present disclosure.

According to an aspect of the present disclosure, there is provided a base station 200 for a radio communication system 1. The base station comprises means (e.g. the access control message module 211) for including S1 an access control parameter in an access control message to be transmitted over a radio interface, the access control parameter being configured for allowing a radio device 100 which receives it as part of an access procedure for accessing the radio communication system 1 to determine whether access to said system is permitted. The base station also comprises means (e.g. the sending module 212) for sending S2 the access control message on a channel which the radio device 100 that intends to connect to the base station 200 has to receive as part of its access procedure. The access control message is sent or indicated on a PDCCH.

According to another aspect of the present disclosure, there is provided a radio device 100 for a radio communication system 1. The radio device comprises means (e.g. the receiving module 111) for receiving S11 an access control message comprising an access control parameter from a base station 200 in the radio communication system, wherein the access control message is received on a PDCCH, or as indicated on the PDCCH, as part of an access procedure for accessing said system. The radio device also comprises means (e.g. the determining module 112) for determining S12, based on the received S11 access control parameter, whether access to the system 1 is permitted.

In accordance with another aspect of the present disclosure, there is provided a method performed in/by a base station or other radio access network (RAN) node in a radio communication system. The method comprises including an access control parameter in an access control message to be transmitted over a radio interface. The method also comprises sending the access control message on a channel which a radio device that intends to connect to the base station has to receive as part of its access procedure.

In accordance with another aspect of the present disclosure, there is provided a computer program product comprising computer-executable components for causing a base station to perform an embodiment of the method aspect performed by a base station of the present disclosure when the computer-executable components are run on processor circuitry comprised in the base station.

In accordance with another aspect of the present disclosure, there is provided a base station/RAN node for a radio communication system. The base station comprises processor circuitry, and a storage unit storing instructions that, when executed by the processor circuitry, cause the base station to include an access control parameter in an access control message to be transmitted over a radio interface. The instructions also cause the base station to send the access control message on a channel which a radio device that intends to connect to the base station has to receive as part of its access procedure. Embodiments of the base station may be configured for performing an embodiment of the method aspect performed by a base station of the present disclosure.

In accordance with another aspect of the present disclosure, there is provided a base station/RAN node for a radio communication system. The base station comprises means (e.g. processor circuitry and/or transmitter circuitry) for including an access control parameter in an access control message to be transmitted over a radio interface. The base station also comprises means (e.g. processor circuitry and/or transmitter circuitry) for sending the access control message on a channel which a UE that intends to connect to the base station has to receive as part of its access procedure. Embodiments of the base station may be configured for performing an embodiment of the method aspect performed by a base station of the present disclosure. Embodiments of the base station may be configured for performing an embodiment of the method aspect performed by a base station of the present disclosure.

In accordance with another aspect of the present disclosure, there is provided a computer program comprising computer program code which is able to, when run on processor circuitry of a base station, cause the base station to include an access control parameter in an access control message to be transmitted over a radio interface. The code is also able to cause the base station to send the access control message on a channel which a radio device that intends to connect to the base station has to receive as part of its access procedure. In accordance with another aspect of the present disclosure, there is provided a computer program product comprising an embodiment of such a computer program aspect of the present disclosure and a computer readable means on which the computer program is stored.

Corresponding aspects of the present disclosure, as in relation to the base station, are also provided for a radio device (e.g. a UE) in the present disclosure.

In accordance with an aspect of the present disclosure, there is provided a method performed in/by a radio device in a radio communication system. The method comprises receiving an access control message comprising an access control parameter from a base station in the radio communication system, wherein the access control message is received on a channel which the radio device listens to as part of a procedure for accessing the base station. The method also comprises using an access procedure for accessing the base station in accordance with the received access control parameter.

In accordance with another aspect of the present disclosure, there is provided a computer program product comprising computer-executable components for causing a radio device to perform an embodiment of the method aspect performed by a radio device of the present disclosure when the computer-executable components are run on processor circuitry comprised in the radio device.

In accordance with another aspect of the present disclosure, there is provided a radio device for a radio communication system. The radio device comprises processor circuitry, and a storage unit storing instructions that, when executed by the processor circuitry, cause the radio device to receive an access control message comprising an access control parameter from a base station in the radio communication system, wherein the access control message is received on a channel which the radio device listens to as part of a procedure for accessing the base station. The instructions also cause the radio device to use an access procedure for accessing the base station in accordance with the received access control parameter. Embodiments of the radio device may be configured for performing an embodiment of the method aspect performed by a radio device of the present disclosure.

In accordance with another aspect of the present disclosure, there is provided a radio device for a radio communication system. The radio device comprises means (e.g. processor circuitry and/or receiver circuitry) for receiving an access control message comprising an access control parameter from a base station in the radio communication system, wherein the access control message is received on a channel which the radio device listens to as part of a procedure for accessing the base station. The radio device also comprises means (e.g. processor circuitry) for using an access procedure for accessing the base station in accordance with the received access control parameter. Embodiments of the radio device may be configured for performing an embodiment of the method aspect performed by a radio device of the present disclosure.

In accordance with another aspect of the present disclosure, there is provided a computer program comprising computer program code which is able to, when run on processor circuitry of a radio device, cause the radio device to receive an access control message comprising an access control parameter from a base station in the radio communication system, wherein the access control message is received on a channel which the radio device listens to as part of a procedure for accessing the base station. The code is also able to cause the radio device to use an access procedure for accessing the base station in accordance with the received access control parameter. In accordance with another aspect of the present disclosure, there is provided a computer program product comprising an embodiment of such a computer program aspect of the present disclosure and a computer readable means on which the computer program is stored.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed in a base station in a radio communication system, the method comprising:
   including an access control parameter in an access control message to be transmitted over a radio interface, the access control parameter being configured for allowing a radio device which receives the access control parameter as part of an access procedure for accessing the radio communication system to determine whether access to said system is permitted; and sending the access control message on a channel which the radio device that intends to connect to the base station has to receive as part of the radio device's access procedure;
the access control message also comprising a parameter for one of controlling and modifying the behaviour of the radio device, the parameter for the one of controlling and modifying the behaviour of the radio device being for modifying the behaviour of the radio device by changing the priority of one of the current cell and radio carrier if the access control parameter indicates that the radio device is not permitted access;
the access control message is sent on a Physical Downlink Control Channel, PDCCH; and
the access control message is one of:
a Downlink Control Information, DCI, format; and
associated with a particular Radio Network Temporary Identity, RNTI.

2. The method of claim 1, further comprising:
receiving access initiating signalling from the radio device;
wherein the access control message is sent in response to said received signalling.

3. A computer storage device storing an executable computer program that, when executed by processor circuitry in a base station, causes the base station to perform a method, comprising:
including an access control parameter in an access control message to be transmitted over a radio interface, the access control parameter being configured for allowing a radio device which receives it as part of an access procedure for accessing the radio communication system to determine whether access to said system is permitted; and
sending the access control message on a channel which the radio device that intends to connect to the base station has to receive as part of its access procedure;
the access control message also comprising a parameter for one of controlling and modifying the behaviour of the radio device, the parameter for the one of controlling and modifying the behaviour of the radio device being for modifying the behaviour of the radio device by changing the priority of one of the current cell and radio carrier if the access control parameter indicates that the radio device is not permitted access;
the access control message is one of sent and indicated on a Physical Downlink Control Channel, PDCCH; and
the access control message is one of:
a Downlink Control Information, DCI, format; and
associated with a particular Radio Network Temporary Identity, RNTI.

4. A base station for a radio communication system, the base station comprising:
processor circuitry; and
a storage unit storing instructions that, when executed by the processor circuitry, cause the base station to:
include an access control parameter in an access control message to be transmitted over a radio interface, the access control parameter being configured for allowing a radio device which receives the access control parameter as part of an access procedure for accessing the radio communication system to determine whether access to said system is permitted; and
send the access control message on a channel which a radio device that intends to connect to the base station has to receive as part of the radio device's access procedure;
the access control message also comprising a parameter for one of controlling and modifying the behaviour of the radio device, the parameter for the one of controlling and modifying the behaviour of the radio device being for modifying the behaviour of the radio device by changing the priority of one of the current cell and radio carrier if the access control parameter indicates that the radio device is not permitted access;
the access control message is sent on a Physical Downlink Control Channel, PDCCH; and
the access control message is one of:
a Downlink Control Information, DCI, format; and
associated with a particular Radio Network Temporary Identity, RNTI.

5. A method performed in a radio device associated with a radio communication system, the method comprising:
receiving an access control message comprising an access control parameter from a base station in the radio communication system, the access control message being received on a Physical Downlink Control Channel, PDCCH, and as part of an access procedure for accessing said system;
determining, based on the received access control parameter, whether access to the system is permitted;
the access control message also comprising a parameter for one of controlling and modifying the behaviour of the radio device, the parameter for the one of controlling and modifying the behaviour of the radio device being for modifying the behaviour of the radio device by changing the priority of one of the current cell and radio carrier if the access control parameter indicates that the radio device is not permitted access; and
the access control message is one of:
a Downlink Control Information, DCI, format; and
associated with a particular Radio Network Temporary Identity, RNTI.

6. The method of claim 5, further comprising:
prior to receiving the access control message, sending an access initiating signalling to the base station.

7. The method of claim 5, wherein the received access control message is addressed to another radio device.

8. The method of claim 5, wherein the determining whether access is permitted comprises determining whether access is permitted to one of:
the base station;
the radio communication system; and
a service provided via the radio communication system.

9. A computer storage device storing an executable computer program that, when executed by processor circuitry in a radio device, causes the radio device to perform a method comprising:
receiving an access control message comprising an access control parameter from a base station in the radio communication system, the access control message being received on a Physical Downlink Control Channel, PDCCH, as part of an access procedure for accessing said system; and
determining, based on the received access control parameter, whether access to the system is permitted;
the access control message also comprising a parameter for one of controlling and modifying the behaviour of the radio device, the parameter for the one of controlling and modifying the behaviour of the radio device being for modifying the behaviour of the radio device by changing the priority of one of the current cell and radio carrier if the access control parameter indicates that the radio device is not permitted access; and the access control message is one of:
- a Downlink Control Information, DCI, format; and
- associated with a particular Radio Network Temporary Identity, RNTI.

10. A radio device for a radio communication system, the radio device comprising:
- processor circuitry; and
- a storage unit storing instructions that, when executed by the processor circuitry, cause the radio device to:
- receive an access control message comprising an access control parameter from a base station in the radio communication system, the access control message being received on a Physical Downlink Control Channel, PDCCH, and as part of an access procedure for accessing said system;
- determine, based on the received access control parameter, whether access to the system is permitted;
- the access control message also comprising a parameter for one of controlling and modifying the behaviour of the radio device, the parameter for the one of controlling and modifying the behaviour of the radio device being for modifying the behaviour of the radio device by changing the priority of one of the current cell and radio carrier if the access control parameter indicates that the radio device is not permitted access; and
- the access control message is one of:
  - a Downlink Control Information, DCI, format; and
  - associated with a particular Radio Network Temporary Identity, RNTI.

11. The method of claim 2, wherein the access initial signalling is a Random Access Preamble.

12. The method of claim 6, wherein the access initial signalling is a Random Access Preamble.

13. The method of claim 6, wherein the determining whether access is permitted comprises determining whether access is permitted to one of:
- the base station;
- the radio communication system; and
- a service provided via the radio communication system.

14. The method of claim 7, wherein the determining whether access is permitted comprises determining whether access is permitted to one of:
- the base station;
- the radio communication system; and
- a service provided via the radio communication system.

15. The computer storage device of claim 9, the method further comprising:
- prior to receiving the access control message, sending an access initiating signalling to the base station.

16. The computer storage device of claim 9, wherein the received access control message is addressed to another radio device.

17. The computer storage device of claim 9, wherein the determining whether access is permitted comprises determining whether access is permitted to one of:
- the base station;
- the radio communication system; and
- a service provided via the radio communication system.

* * * * *